June 2, 1959  L. L. ICENHOWER  2,888,684
TRIM STRIP AND MOUNTING
Filed April 22, 1957

INVENTOR.
LANGDON L. ICENHOWER
BY CORBETT, MAHONEY & MILLER, ATTYS.
BY Wm. V. Miller

United States Patent Office
2,888,684
Patented June 2, 1959

2,888,684

TRIM STRIP AND MOUNTING

Langdon L. Icenhower, Columbus, Ohio

Application April 22, 1957, Serial No. 654,091

5 Claims. (Cl. 4—187)

My invention relates to a trim strip and mounting. It has to do, more particularly, with a trim strip which is to be associated with a mounting structure such as a sink mounting for overlying the joint between the object to be mounted and the supporting structure to give a pleasing appearance.

In the following description, I will describe my invention as being associated with a sink mounting for a sink of the flat rim type. However, it is to be understood that it can be associated with other mountings to cover the joint between the object to be mounted and the support therefor.

It is the main object of this invention to provide a trim strip for a sink mounting or similar structure which can be readily applied to the mounting after the sink is positioned thereon with the mounting in position on a supporting structure, the trim strip extending into overlapping relationship to the adjacent surface of the sink and the support to give a pleasing finished appearance.

Another object of my invention is to provide a trim strip and mounting therefor which cooperate in such a manner that relative movement between the sink and support will not loosen the trim strip and allow it to buckle or pull away from the mounting.

Another object of my invention is to provide a trim strip and mounting of the type indicated which is so designed that when the trim strip is once positioned on the mounting, it cannot be pulled therefrom unless the removing force is applied in a predetermined manner.

Various other objects will be apparent.

In the accompanying drawing, I have illustrated an example of my invention but it is to be understood that specific details thereof can be varied without departing from basic principles.

Figure 2:
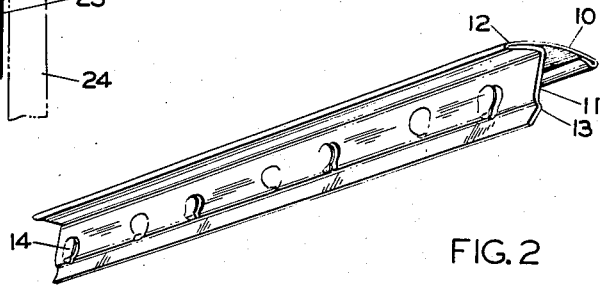
Figure 2 is a perspective view illustrating a section of the trim strip.

With reference to the drawing, in Figure 2 I have illustrated the trim strip. This strip is preferably formed of metal such as aluminum or stainless steel although it could be of other materials such as plastic provided they have the necessary strength and resiliency. However, as indicated, metal is preferred.

The strip is of substantially T-cross-section and comprises an upper flange 10 which extends the full length thereof and which may be of any suitable contour to give a pleasing trim surface. Depending from the upper flange 10 is a web 11, it being understood that the flange 10 and the web 11 extend the full length of the strip. The web 11 may be joined to the flange 10 in any suitable manner but in the example shown is connected by a bend 12. It will be apparent that this strip has been formed by a rolling operation from flat stock but it could be extruded.

The depending web 11 is provided with a continuous rib 13 formed at its lower edge. This rib 13 is of substantially V-cross-section. Directly above the rib 13, at longitudinally spaced intervals, there are formed the protuberances in the form of bosses 14 which are stamped and pressed out of the metal of the web 11. These bosses 14 project in a direction opposite to the projection of the rib 13 or being on opposite sides of the vertical plane thereof. It will be noted from Figures 3 and 3a that the bosses 14 are arcuate in the vertical direction and are spaced substantially below the upper flange 10 of the strip.

Figure 5:
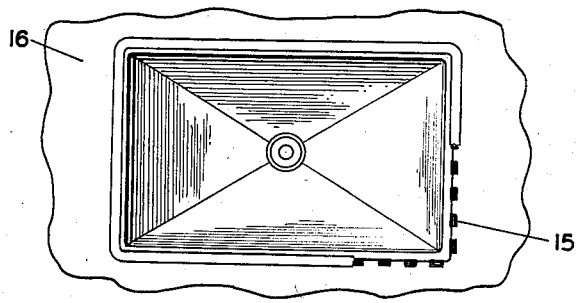
Figure 5 is a plan view illustrating the trim strip and mounting associated with a sink.

The mounting for the strip comprises the channel sections 15 which may be used in any desired number depending upon the length of the mounting. If the mounting is a sink mounting as shown in Figure 5, a sufficient number of the sections 15 will be disposed in longitudinally spaced relationship to provide sufficient support between the sink and the edge of the opening in the counter 16 which is to receive the sink. The trim strip will be continuous around the sink.

Each mounting channel section 15 comprises the upwardly opening channel 17 which has flat side walls with the exception that in the one side wall adjacent the bottom of the channel a V-groove 18 is provided for the entire length thereof. This V-groove 18 is complemental to and is adapted to receive the V-rib 13 which will be snapped thereinto.

Figure 1:
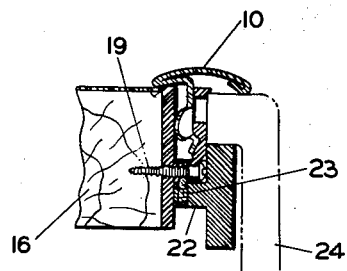
Figure 1 is a transverse sectional view taken through a trim strip and mounting embodying my invention and indicating how it is used in supporting a sink.

If this structure is used for mounting a sink, as shown in Figures 1 and 5, the channel sections 15 will be fastened to the edge of the support 16 by means of screws 19 passing through openings 20 in the bottom wall of the channel 17. Sink-supporting lugs 22 are attached to the lower side of the channel sections 15 by means of screws 23 passing downwardly through openings provided in the bottom of the channel 17. The lugs 22 will support the sink 24 on the channel sections 15 and by adjusting the screws 23, the sink may be located flush with the surrounding counter surface 16.

With the sink supported as indicated, the trim strip is applied merely by positioning the web 11 in the channel 17 of the section 15. Then the strip is forced downwardly until the rib 13 snaps into the receiving groove 18 formed in the channel. It will be understood that the channel 17 will be of less width than the combined width of the bosses 14 and the rib 13. The bosses 14 will be compressed slightly as the strip is pushed into the channel and will expand to force the rib 13 into the groove 18 as soon as the rib comes to a position opposite to the groove. Preferably at least two bosses 14 are positioned in each channel section 15.

In most instances, after the trim strip is applied to the sink mounting in this manner, it will remain in position until it is necessary to replace the sink. Expansion and contraction of the sink relative to the supporting counter surface 16 or other relative movement will not loosen the trim strip from the mounting because the bosses 14 are always pressing the rib 13 into the groove 18 as indicated by the lower hollow arrow A in Figure 3a. Furthermore, as indicated by the solid arrow B in this figure, if a force is applied at the edge of the flange 10, adjacent the sink in an attempt to remove the strip, this will merely increase the forcing of the rib 13 into the groove 18. This is caused by the fact that the bosses 14 will act as a fulcrum about which the web 11 will rock and this will increase the retaining force at the groove 18, indicated by the arrow A, and at the upper edge of the inner wall of the channel 17, as indicated by the hollow arrow C.

Figure 3:
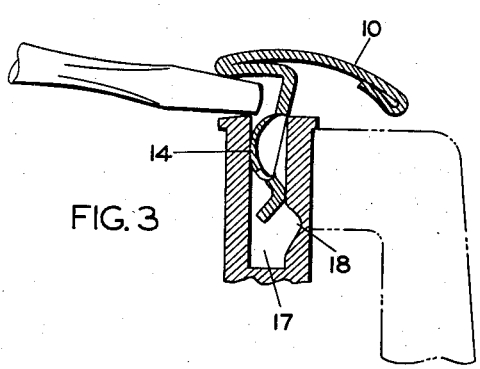
Figure 3 is an enlarged transverse sectional view illustrating how the trim strip can be removed from the mounting if the force is applied in the proper manner.
Figure 3A:
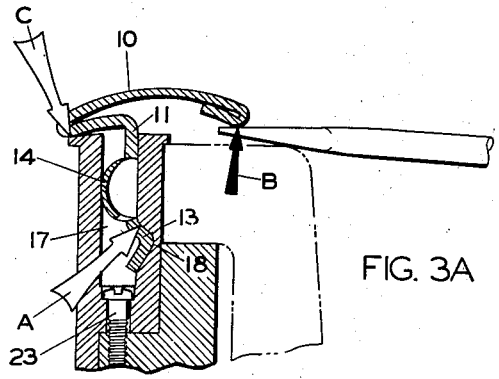
Figure 3a is a similar view but showing how the force applied in an improper manner will not remove the trim strip.
Figure 4:
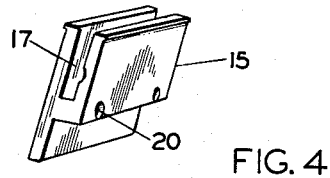
Figure 4 is a perspective view illustrating a section of the mounting rim which will receive the trim strip.

However, in some cases it will be desirable to remove the trim strip and this can be accomplished as indicated in Figure 3. This may be desirable in case of damage to the sink during installation or replacement of the sink for some cause after installation. This can be accomplished readily by inserting a tool between the edge of the flange 10 and the upper edge of the inner wall of the channel 17. This prying force will pull the web 11 upwardly so that the bosses 14 will be compressed and the rib 13 will be allowed to move laterally out of the groove 18. The strip can be readily repositioned in the channel merely by pushing it down into the channel as previously described.

It will be apparent that I have provided a novel trim strip and mounting in which the trim strip can be easily applied to the mounting and will be retained effectively thereon until it is desired to remove it. Removal can be accomplished readily if certain positive steps are followed as indicated above. The mounting and the associated trim strip are of such a nature that all installation work or removal work can be performed from above the sink and it is not necessary to work beneath the sink in the limited space usually available therebeneath.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A mounting device comprising an upwardly opening channel support, a trim strip having a web positioned in the channel of said support and having flanges extending in opposite directions over the outer edge of the channel, said channel having opposed spaced walls, said trim strip web having a rib at one side thereof and a yieldable protuberance at the other side thereof, the wall of the channel adjacent the side of the web having the rib thereon being provided with a locking groove for receiving said rib and said protuberance being vertically spaced from and located generally oppositely of the position of the rib and contacting the surface of the other wall so that pressure applied at the edge of the flange at the opposite side will rock the web about the protuberance as a fulcrum to increase the forcing of the rib into the groove but prying pressure applied beneath the flange on the corresponding side will move the rib laterally out of the groove to permit removal of the trim strip from the channel.

2. A mounting device according to claim 1 in which the protuberance comprises a plurality of longitudinally spaced yieldable bosses disposed along the web said bosses projecting a distance greater than the width of the channel but being yieldable so that the web can be forced into the channel.

3. A mounting device according to claim 2 in which the bosses are rounded in a vertical direction.

4. A mounting device according to claim 3 in which the rib is a continuous rib and the locking groove is a continuous groove complemental to the rib.

5. A mounting device according to claim 4 in which the channel is composed of a plurality of sections arranged in alignment and longitudinally spaced and the strip is a continuous strip.

References Cited in the file of this patent
UNITED STATES PATENTS

| | | |
|---|---|---|
| 1,312,056 | Shaw | Aug. 5, 1918 |
| 1,909,353 | Hughes | May 16, 1933 |
| 2,625,054 | Bauman | Jan. 13, 1953 |
| 2,708,275 | Icenhower | May 17, 1955 |